UNITED STATES PATENT OFFICE.

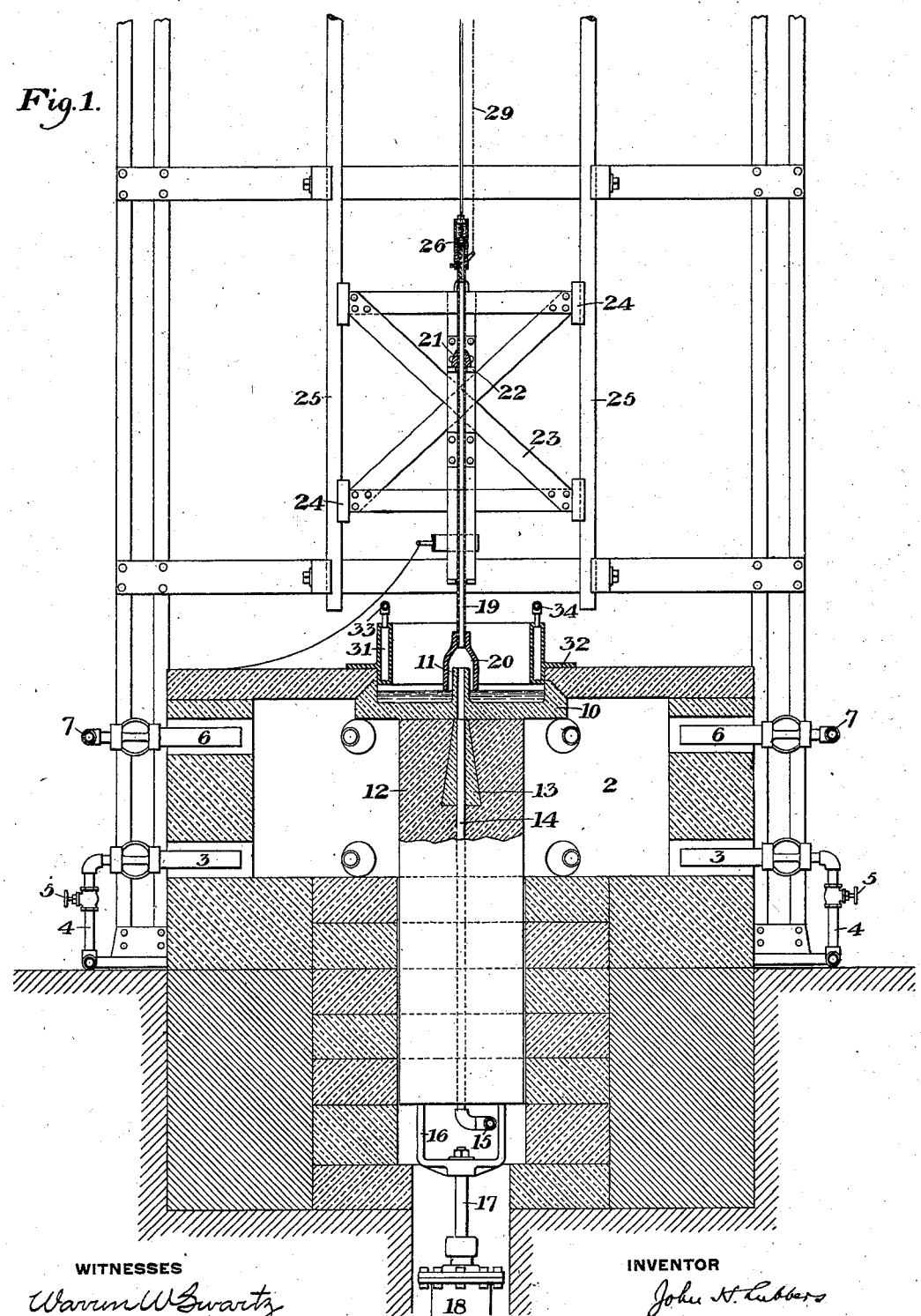

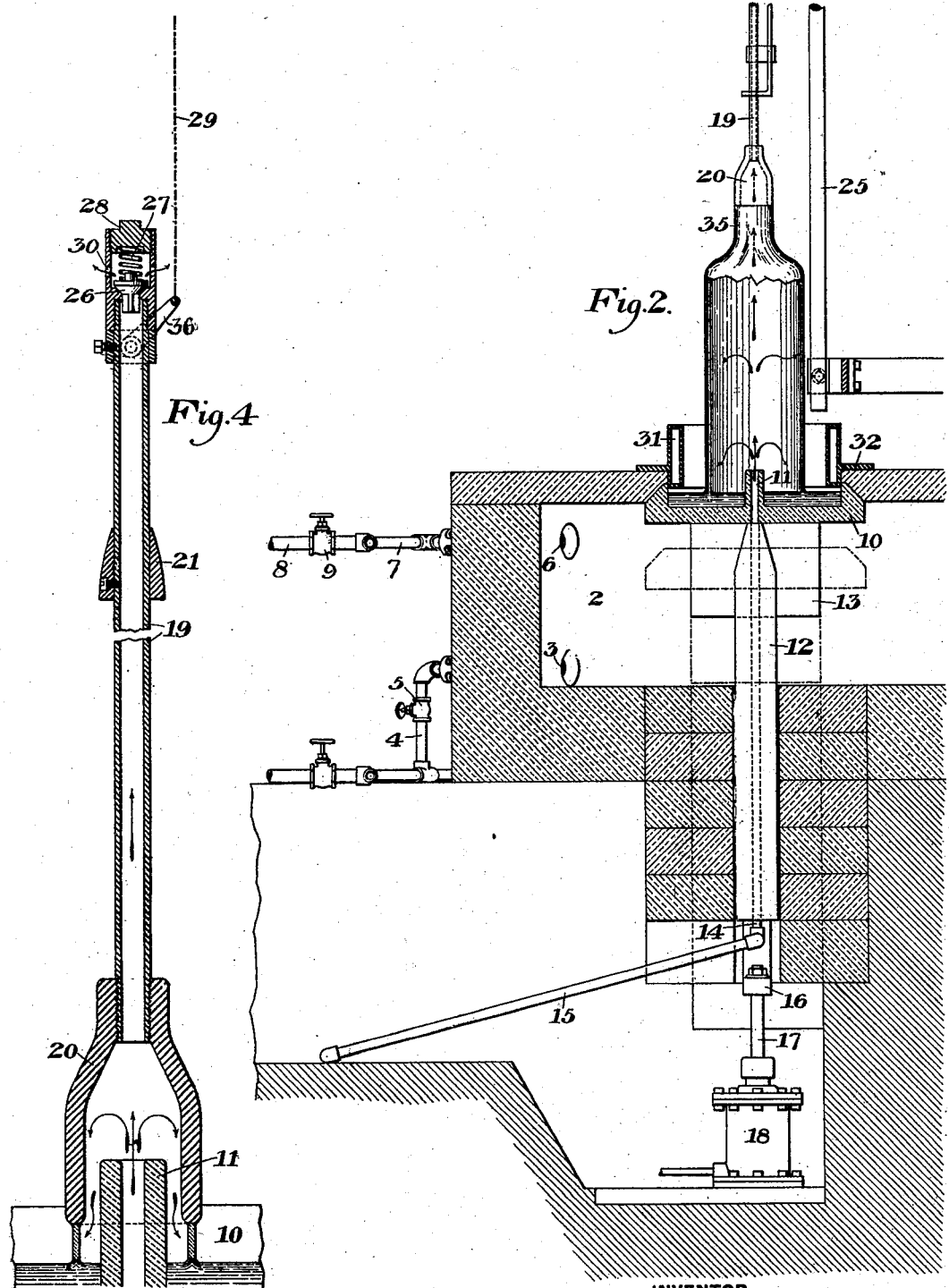

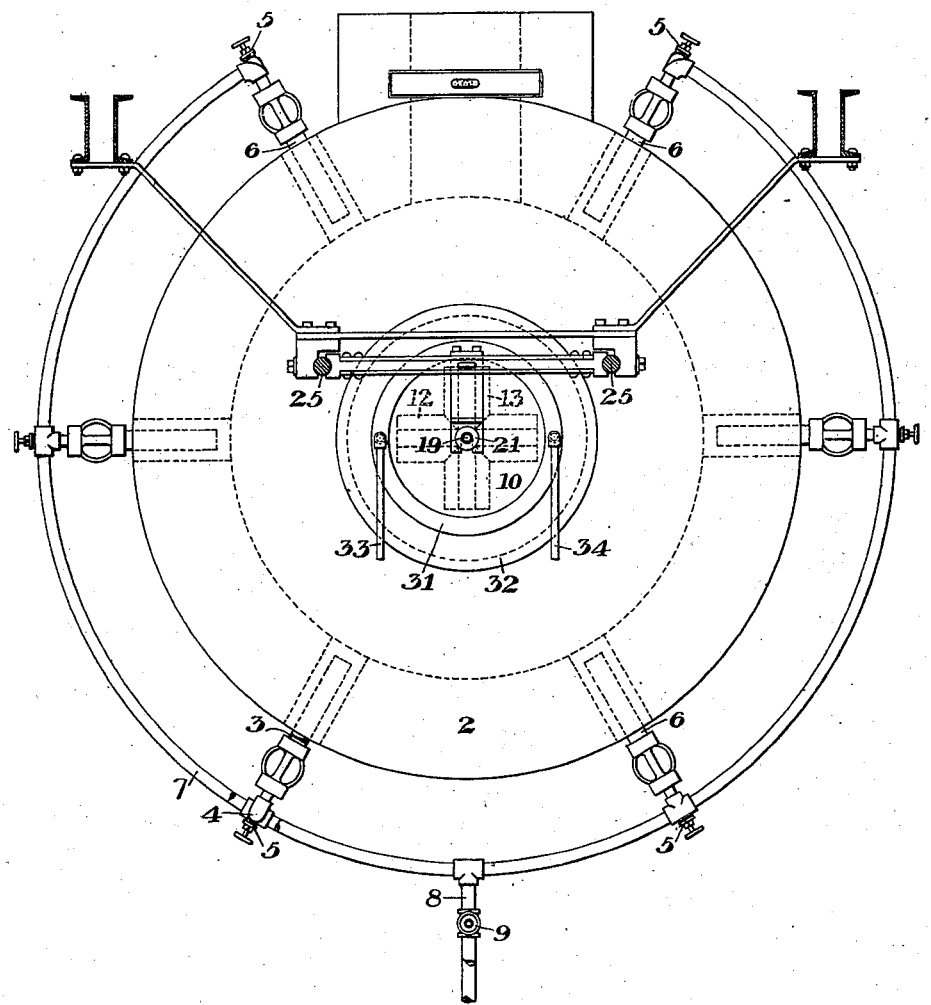

JOHN H. LUBBERS, OF ALLEGHENY, PENNSYLVANIA, ASSIGNOR, BY DIRECT AND MESNE ASSIGNMENTS, TO JAMES A. CHAMBERS, TRUSTEE, OF PITTSBURG, PENNSYLVANIA.

APPARATUS FOR DRAWING GLASS.

SPECIFICATION forming part of Letters Patent No. 702,017, dated June 10, 1902.

Application filed January 10, 1902. Serial No. 89,156. (No model.)

*To all whom it may concern:*

Be it known that I, JOHN H. LUBBERS, of Allegheny, Allegheny county, Pennsylvania, have invented a new and useful Apparatus for Drawing Glass, of which the following is a full, clear, and exact description, reference being had to the accompanying drawings, forming part of this specification, in which—

Figure 1 is a partial sectional elevation showing apparatus constructed in accordance with my invention. Fig. 2 is a similar view at right angles to Fig. 1. Fig. 3 is a sectional top plan view, and Fig. 4 is an enlarged vertical section, of the drawing-tool, showing the beginning of the drawing operation.

My invention relates to the drawing of glass cylinders or hollow glass articles from a bath of molten glass and is designed to provide improved apparatus for the manufacture of commercial rollers or other hollow glass articles.

To that end the invention consists in providing an inlet for supplying air to the interior of the article and also an outlet therefrom, which allow a current through the interior of the article, and, further, in using an outlet-valve which will produce a constant pressure during the drawing in connection with the current circulating through the article. It also consists in providing means for raising and lowering the pot, thus enabling the same to be heated between drawing operations, and, further, in the construction and arrangement of the parts, as hereinafter more fully described, and set forth in the claims.

In the drawings, in which I show a preferred form of my apparatus, 2 represents a furnace which I have shown of cylindrical form, though other forms may be used, and which is preferably heated by a series of lower gas-burners 3, each having a gas-supply pipe 4, controlled by hand-valve 5. These burners project through holes in the side walls, and I also preferably provide an upper series of similar burners 6, which are connected to a common supply-pipe 7, extending around the furnace and receiving gas from a pipe 8, having valve 9. These upper burners are used principally for assisting in severing the article from the bath.

The pot or receptacle 10 to contain the glass is of annular form with a central hollow boss or raised portion 11, which extends upwardly above the level of the bath. The pot is carried upon a refractory support 12, which may be rectangular in cross-section and is provided with an upper transversely-extending refractory block 13, giving a cross-shaped portion at the top for the pot. A gaseous supply-pipe 14 extends centrally and longitudinally through the support 12 and is connected at its lower end to a swinging supply-pipe 15, connected to a source of compressed air. The support 12 is carried upon an iron block 16, secured to the piston-rod 17 of the motive cylinder 18.

The drawing-tool 19 is of substantially the form of a glass-blower's pipe, the lower end portion 20 forming a bait, which surrounds the nipple or hollow boss 11 when it is dipped into the bath. The pipe is provided with a ring 21, which rests upon a forked support 22, carried on the frame 23, having side guides 24 sliding upon the vertical guide-rods 25. The upper end of the pipe is closed by a valve which seats downwardly and is held yieldingly to its seat by a spiral spring 27, the pressure of which may be adjusted by a screw-plug 28. The drawing rope or cable 29 is secured by yoke 36 to the valve-chamber, which chamber is provided with side outlets 30, through which the air may escape to the outer air whenever the pressure is sufficient to overcome the force of the closing-spring.

A water-cooled ring 31 is removably seated within the hole in the top of the furnace in which the pot fits when in upper position, this ring being supported by a suitable flange 32 and having inlet and outlet pipes 33 and 34. A constant circulation of water or cooling fluid is maintained through this cooling-ring.

In using my improved apparatus the pot is heated and provided with molten glass and is held in its upper position, wherein its sides shield the surface of the bath from the heat within the furnace-chamber. The drawing-tool is then lowered into the bath, and air being supplied through pipes 15 and 14 the tool is drawn upwardly. The air-pressure is first regulated to form the neck portion 35, as shown in Fig. 2, and is then increased to swell out the glass to the size of the cylinder desired. The air is then allowed to flow upwardly into this cylinder during the drawing operation, and a substantially constant pressure is obtained therein by reason of the check-valve, which lifts as the pressure rises above a certain limit, the air-supply being sufficient to at least hold the pressure uniform as the cylinder increases in length. A circulation of air or cooling gaseous fluid is thus allowed through the article, which serves to chill its inner surface, while the water-cooled ring chills the outer surface of the article at or near the drawing-point. When an article of the desired length is obtained, the air is shut off to cause the lower end of the article to contract, and the pot is then lowered and the upper burners turned on, thus causing a cutting-flame to impinge upon the lower end of the article and sever it from the bath. The water-cooled ring is then removed and a cover placed over the hole, and the heat in the furnace raises the temperature of the remaining glass in the pot and prepares it for the next drawing operation. The glass may be ladled into the pot as needed.

The advantages of the invention result from the circulating of the gaseous fluid through the cylinder or article during the drawing operation and the maintaining of a pressure therein while allowing the circulation, and also from the raising and lowering the pot for shielding or allowing access of the flame, and the simplicity and compactness of the apparatus.

The air may be supplied through the drawing-tool, and the exit-port for the air may be either through the pot or through the drawing-tool. The use of the outer water-cooled ring may be dispensed with, and the apparatus may be varied in many other ways without departing from my invention.

I claim—

1. In apparatus for drawing hollow glass articles, a receptacle arranged to contain a bath of molten glass, and a drawing-tool, said parts (the receptacle and drawing-tool) having a fluid inlet and outlet arranged to allow the circulation of gaseous fluid through the article being drawn; substantially as described.

2. Apparatus for drawing hollow glass articles, comprising a receptacle for molten glass having a fluid-port leading upwardly through the glass, a hollow drawing-tool, and means for allowing gaseous fluid to flow through the tool, the article and the port during the drawing operation; substantially as described.

3. In apparatus for drawing hollow glass articles, a hollow bait, mechanism for allowing a circulation of gaseous fluid through the article being drawn, and a relief-valve arranged to open at a certain pressure to allow the fluid to escape; substantially as described.

4. In apparatus for forming glass articles, a furnace, a receptacle for molten glass therein, a drawing-tool, and mechanism for raising and lowering the receptacle within the furnace; substantially as described.

5. In apparatus for drawing glass articles, a furnace, a vertically-movable pot therein arranged to shield the surface of the glass when in its upper position, and means for lowering the pot to allow access of the heat to the surface of the glass; substantially as described.

6. In apparatus for drawing hollow glass articles, a hollow drawing tool or bait, means for allowing flow of gaseous fluid through the article, and a yieldingly-pressed relief-valve; substantially as described.

7. Apparatus for drawing hollow glass articles, comprising a receptacle arranged to contain a bath of molten glass, a hollow drawing-tool, a fluid-inlet arranged to admit gaseous fluid to the article being drawn, and a fluid-outlet arranged to allow a portion of the gaseous fluid to escape during the drawing operation; substantially as described.

8. In apparatus for forming hollow glass articles, a heated chamber, a receptacle for molten glass located therein, a hollow drawing-tool, a fluid-inlet arranged to admit gaseous fluid to the article being drawn, a fluid-outlet arranged to allow a portion of the fluid to escape, and mechanism for raising and lowering the receptacle; substantially as described.

In testimony whereof I have hereunto set my hand.

JOHN H. LUBBERS.

Witnesses:
GEO. B. BLEMING,
H. M. CORWIN.